(12) United States Patent
Matsumoto et al.

(10) Patent No.: US 10,271,348 B2
(45) Date of Patent: Apr. 23, 2019

(54) USER TERMINAL AND BASE STATION

(71) Applicant: KYOCERA CORPORATION, Kyoto (JP)

(72) Inventors: Naohisa Matsumoto, Higashiomi (JP); Kugo Morita, Higashiomi (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/558,990

(22) PCT Filed: Mar. 17, 2016

(86) PCT No.: PCT/JP2016/058536
§ 371 (c)(1),
(2) Date: Sep. 15, 2017

(87) PCT Pub. No.: WO2016/148243
PCT Pub. Date: Sep. 22, 2016

(65) Prior Publication Data
US 2018/0249494 A1  Aug. 30, 2018

Related U.S. Application Data

(60) Provisional application No. 62/134,218, filed on Mar. 17, 2015.

(51) Int. Cl.
*H04L 12/24* (2006.01)
*H04L 5/14* (2006.01)
(Continued)

(52) U.S. Cl.
CPC ....... *H04W 72/1284* (2013.01); *H04L 1/1812* (2013.01); *H04W 56/00* (2013.01); *H04W 72/14* (2013.01); *H04W 84/12* (2013.01)

(58) Field of Classification Search
CPC .......... H04W 56/001; H04W 72/1205; H04W 72/1278
See application file for complete search history.

(56) References Cited

U.S. PATENT DOCUMENTS

| | | | | |
|---|---|---|---|---|
| 2008/0043669 | A1* | 2/2008 | Gallagher | H04W 92/02 370/329 |
| 2014/0177540 | A1* | 6/2014 | Novak | H04W 72/042 370/329 |

(Continued)

OTHER PUBLICATIONS

International Search Report issued in PCT/JP2016/058536; dated Jun. 7, 2016.

(Continued)

*Primary Examiner* — Faruk Hamza
*Assistant Examiner* — Abusayeed M Haque
(74) *Attorney, Agent, or Firm* — Studebaker & Brackett PC

(57) ABSTRACT

A user terminal according to a first aspect is used in a mobile communication system. The user terminal includes: a receiver configured to receive, from a base station, candidate timing information indicating candidate timings of uplink transmission in an unlicensed band channel, which is an unlicensed band frequency channel; a controller configured to determine a transmission timing to perform the uplink transmission to the base station from among the candidate timings indicated by the candidate timing information, by monitoring the unlicensed band channel; and a transmitter configured to transmit uplink data to the base station via the unlicensed band channel at the transmission timing.

21 Claims, 17 Drawing Sheets

(51) Int. Cl.
*H04W 84/18* (2009.01)
*H04L 29/06* (2006.01)
*H04W 72/12* (2009.01)
*H04W 84/12* (2009.01)
*H04L 1/18* (2006.01)
*H04W 72/14* (2009.01)
*H04W 56/00* (2009.01)

(56) References Cited

U.S. PATENT DOCUMENTS

| | | | | |
|---|---|---|---|---|
| 2015/0163805 | A1* | 6/2015 | Cattoni | H04W 74/006 370/329 |
| 2015/0289270 | A1* | 10/2015 | Knapp | H04L 27/0006 455/452.1 |
| 2016/0073344 | A1* | 3/2016 | Vutukuri | H04W 52/0216 370/252 |
| 2016/0269978 | A1* | 9/2016 | Bashar | H04J 11/00 |
| 2016/0366554 | A1* | 12/2016 | Markhovsky | G01S 3/46 |

OTHER PUBLICATIONS

3rd Generation Partnership Project; Technical Specification Group Radio Access Network; Study on Licensed-Assisted Access to Unlicensed Spectrum; 3GPP TR36.889 V0.1.1; Nov. 2014; pp. 1-40; Release 13; 3GPP Organizational Partners.

* cited by examiner

USER TERMINAL AND BASE STATION

TECHNICAL FIELD

The present invention relates to a user terminal and a base station used in a mobile communication system.

BACKGROUND ART

In the 3rd Generation Partnership Project (3GPP) that is a mobile communication system standardization project, attempts have been made to enhance Long Term Evolution (LTE) in order to meet rapidly increasing traffic demands.

As one of such attempts, it has been studied to use not only a frequency band (licensed band) for which a license is granted to an operator but also a frequency band (unlicensed band) for which a license is unnecessary in LTE communication.

In the unlicensed band, a listen-before-talk (LBT) procedure is required to avoid interference with other system (wireless LAN or the like) different from an LTE system or with an LTE system of other operator.

The LBT procedure is a procedure that confirms whether or not a frequency channel (carrier) of an unlicensed band is clear based on received power (interference power) and uses the frequency channel only in the case of being confirmed as a clear channel (see Non-Patent Literature 1).

CITATION LIST

Non Patent Literature

Non-Patent Literature 1: 3GPP Technical Report "TR36.889 V0.1.1" in November, 2014

SUMMARY OF INVENTION

A user terminal according to a first aspect is used in a mobile communication system. The user terminal includes: a receiver configured to receive, from a base station, candidate timing information indicating candidate timings of uplink transmission in an unlicensed band channel, which is an unlicensed band frequency channel; a controller configured to determine a transmission timing to perform the uplink transmission to the base station from among the candidate timings indicated by the candidate timing information, by monitoring the unlicensed band channel; and a transmitter configured to transmit uplink data to the base station via the unlicensed band channel at the transmission timing.

A base station according to a second aspect is used in a mobile communication system. The base station includes: a transmitter configured to transmit, to a user terminal, candidate timing information indicating candidate timings of uplink transmission in an unlicensed band channel, which is an unlicensed band frequency channel; and a receiver configured to receive uplink data from the user terminal via the unlicensed band channel at a transmission timing determined by the user terminal from among the candidate timings indicated by the candidate timing information.

DESCRIPTION OF EMBODIMENTS

Overview of Embodiments

Figure 1:
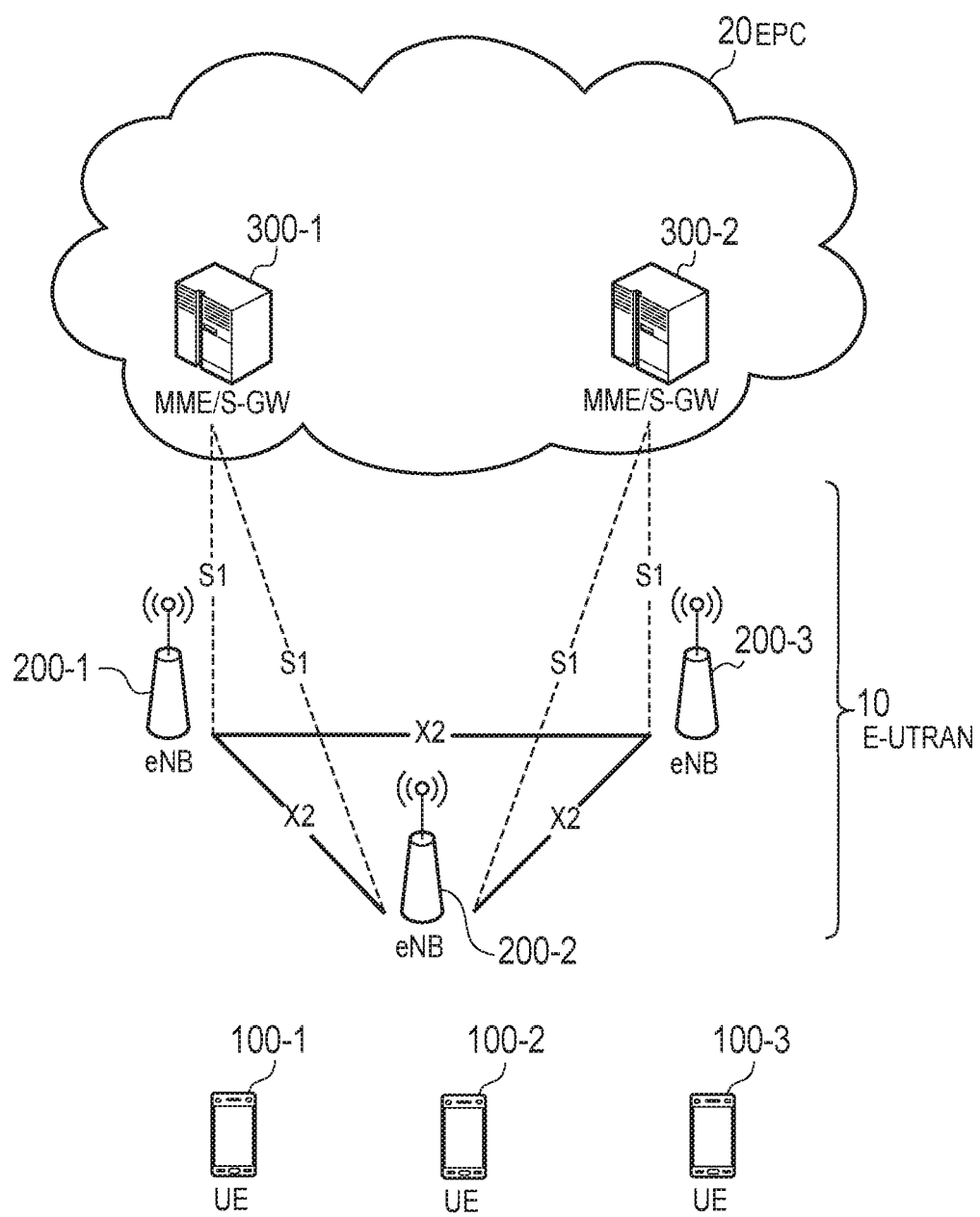
FIG. 1 is a configuration diagram of a mobile communication system (LTE system) according to first to eighth embodiments.

In general LTE uplink scheduling, a base station transmits uplink scheduling information (UL Scheduling Grant) to a user terminal. The user terminal transmits uplink data to the base station four subframes after receiving the "UL Scheduling Grant". That is, there is a "transmission delay" in a mechanism.

On the other hand, there is a severe variation in propagation environment in a frequency channel of an unlicensed band (hereinafter, referred to as an "unlicensed band channel") as compared with a licensed band because there are other systems or other operators.

Accordingly, when the general LTE uplink scheduling mechanism is directly applied to the unlicensed band channel, it is difficult to perform appropriate uplink communication due to the above-described transmission delay.

Thus, an object of the embodiments is to provide a user terminal and a base station capable of performing appropriate uplink communication in an unlicensed band.

(User Terminal)

A user terminal according to first to eighth embodiments is used in a mobile communication system. The user terminal includes: a receiver configured to receive, from a base station, candidate timing information indicating candidate timings of uplink transmission in an unlicensed band channel, which is an unlicensed band frequency channel; a controller configured to determine a transmission timing to perform the uplink transmission to the base station from among the candidate timings indicated by the candidate timing information, by monitoring the unlicensed band channel; and a transmitter configured to transmit uplink data to the base station via the unlicensed band channel at the transmission timing.

In the first to eighth embodiments, the receiver is configured to receive the candidate timing information transmitted from the base station via a licensed band.

In the first to eighth embodiments, the transmitter is configured to transmit the uplink data using a whole band of the unlicensed band channel.

In the second embodiment, the transmitter is configured to transmit, to the base station via a licensed band, a notification signal which indicates that the uplink data is transmitted via the unlicensed band channel.

In the third embodiment, the transmitter is configured to transmit identification information of the own user terminal together with the uplink data via the unlicensed band channel.

In a modification of the second embodiment, the transmitter is configured to transmit the uplink data scrambled with identification information of the own user terminal via the unlicensed band channel.

In the fourth embodiment, the receiver is configured to receive the candidate timing information from the base station via a physical downlink control channel.

In the fourth embodiment, the receiver is configured to receive the candidate timing information instead of receiving information indicating a resource block that needs to be used for uplink transmission.

In the fifth embodiment, the transmitter is configured to further transmit, to the base station, HARQ information which indicates an HARQ process and/or a redundancy version corresponding to the uplink data.

In the fifth embodiment, the receiver is configured to further receive, from the base station, HARQ information which indicates a HARQ process and/or a redundancy version associated with the candidate timing information. The transmitter is configured to transmit the uplink data according to the HARQ information at the transmission timing.

In the seventh embodiment, the candidate timing information is information indicating a period including a plurality of the candidate timings. The transmitter is configured to transmit the uplink data corresponding to only one HARQ process and/or one redundancy version within the period.

(Base Station)

A base station according to first to eighth embodiments is used in a mobile communication system. The base station includes: a transmitter configured to transmit, to a user terminal, candidate timing information indicating candidate timings of uplink transmission in an unlicensed band channel, which is an unlicensed band frequency channel; and a receiver configured to receive uplink data from the user terminal via the unlicensed band channel at a transmission timing determined by the user terminal from among the candidate timings indicated by the candidate timing information.

In the first to eighth embodiments, the transmitter is configured to transmit the candidate timing information to the user terminal via a licensed band.

In the first to eighth embodiments, the receiver is configured to receive the uplink data transmitted using a whole band of the unlicensed band channel.

In the second embodiment, the receiver is configured to receive, from the user terminal via a licensed band, a notification signal which indicates that the uplink data is transmitted via the unlicensed band channel.

In the third embodiment, the receiver is configured to receive identification information of the user terminal together with the uplink data via the unlicensed band channel.

In a modification of the third embodiment, the receiver is configured to receive the uplink data scrambled with identification information of the user terminal via the unlicensed band channel.

In the fourth embodiment, the transmitter is configured to transmit the candidate timing information to the user terminal via a physical downlink control channel.

In the fourth embodiment, the transmitter is configured to transmit the candidate timing information instead of transmitting information indicating a resource block that needs to be used for uplink transmission.

In the fifth embodiment, the receiver is configured to further receive, from the user terminal, HARQ information which indicates an HARQ process and/or a redundancy version corresponding to the uplink data.

In the sixth embodiment, the transmitter is configured to further transmit, to the user terminal, HARQ information which indicates a HARQ process and/or a redundancy version associated with the candidate timing information. The receiver is configured to receive the uplink data according to the HARQ information at the transmission timing determined by the user terminal.

In the seventh embodiment, the candidate timing information is information indicating a period including a plurality of the candidate timings. The receiver is configured to receive the uplink data corresponding to only one HARQ process and/or one redundancy version within the period.

In the eighth embodiment, the transmitter is configured to transmit first candidate timing information to a first user terminal and transmit second candidate timing information to a second user terminal. The first candidate timing information is information indicating a first period comprising a plurality of candidate timings. The second candidate timing information is information indicating a second period including a plurality of candidate timings. Some candidate timings included in the first period overlap some candidate timings included in the second period.

First Embodiment (Mobile Communication System)

Hereinafter, an LTE system which is a mobile communication system according to a first embodiment will be described. FIG. 1 is a diagram illustrating a configuration of the LTE system.

As illustrated in FIG. 1, the LTE system includes a user equipment (UE) 100, an evolved-UMTS terrestrial radio access network (E-UTRAN) 10, and an evolved packet core (EPC) 20.

The UE 100 corresponds to a user terminal. The UE 100 is a mobile communication device and performs radio communication with a cell (serving cell). A configuration of the UE 100 will be described later.

The E-UTRAN 10 corresponds to a radio access network. The E-UTRAN 10 includes an evolved Node-B (eNB) 200. The eNB 200 corresponds to a base station. The eNBs 200 are connected to each other via an X2 interface. A configuration of the eNB 200 will be described later.

The eNB 200 manages one or a plurality of cells and performs radio communication with the UE 100 that establishes a connection with its own cell. The eNB 200 has a radio resource management (RRM) function, a routing function of user data (hereinafter, referred to simply as "data"), a measurement control function for mobility control and scheduling, and the like. The "cell" is used not only as a term indicating a minimum unit of a radio communication area but also as a term indicating a function of performing radio communication with the UE 100.

The EPC 20 corresponds to a core network. The EPC 20 includes a Mobility Management Entity (MME)/Serving-Gateway (S-GW) 300. The MME performs various types of mobility control and the like with respect to the UE 100. The S-GW performs data transfer control. The MME/S-GW 300 is connected to the eNB 200 via an S1 interface. The E-UTRAN 10 and the EPC 20 form a network.

Figure 2:
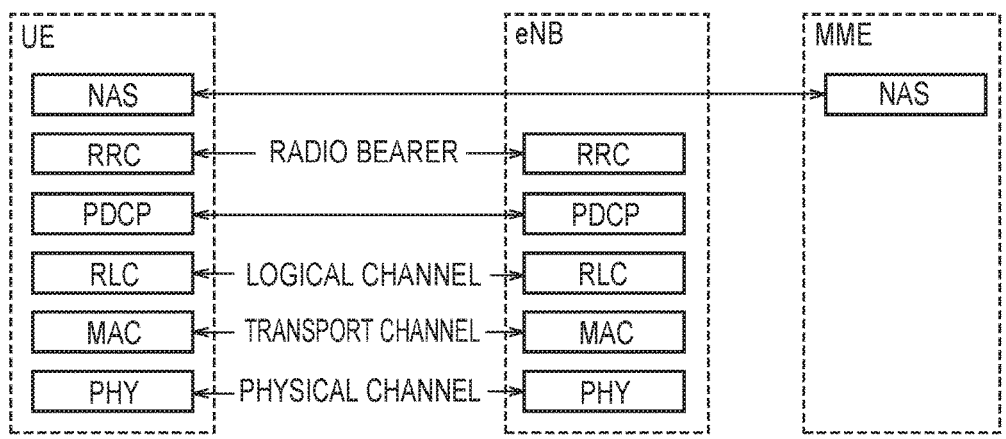
FIG. 2 is a protocol stack diagram of a radio interface according to the first to eighth embodiments.

FIG. 2 is a protocol stack diagram of a radio interface in the LTE system. As illustrated in FIG. 2, a radio interface protocol is divided into a first layer to a third layer of an OSI reference model, and the first layer is a physical (PHY) layer. The second layer includes a medium access control (MAC) layer, a radio link control (RLC) layer, and a packet data convergence protocol (PDCP) layer. The third layer includes a radio resource control (RRC) layer.

The physical layer performs coding and decoding, modulation and demodulation, antenna mapping and demapping, and resource mapping and demapping. Data and a control signal are transmitted via a physical channel between a physical layer of the UE 100 and a physical layer of the eNB 200.

The MAC layer performs priority control of data, and a retransmission process and the like by hybrid ARQ (HARQ), and a random access procedure, and the like. Data and a control signal are transmitted via a transport channel between a MAC layer of the UE 100 and a MAC layer of the eNB 200. The MAC layer of the eNB 200 includes a transport format of an uplink and a downlink (a transport block size, a modulation and coding scheme (MCS)) and a scheduler to determine (schedule) an allocated resource block to the UE 100.

The RLC layer transmits data to the RLC layer of a reception side using the functions of the MAC layer and the physical layer. Data and a control signal are transmitted via a logical channel between an RLC layer of the UE 100 and an RLC layer of the eNB 200.

The PDCP layer performs header compression and decompression, and encryption and decryption.

The RRC layer is defined only in a control plane handling the control signal. A message (RRC message) for various types of setting is transmitted between an RRC layer of the UE 100 and an RRC layer of the eNB 200. The RRC layer controls the logical channel, the transport channel, and the physical channel in response to establishment, re-establishment, and release of a radio bearer. The UE 100 is in an RRC connected state when there is a connection (an RRC connection) is established between the RRC of the UE 100 and the RRC of the eNB 200, and the UE 100 is in an RRC idle state in the opposite case.

The non-access stratum (NAS) layer positioned above the RRC layer performs session management, mobility management, and the like.

Figure 3:
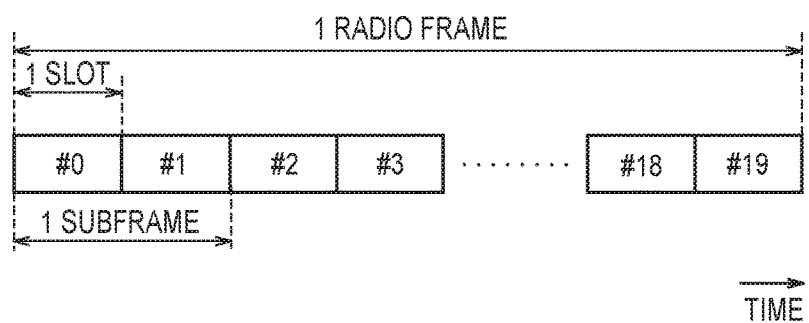
FIG. 3 is a configuration diagram of a radio frame according to the first to eighth embodiments.

FIG. 3 is a configuration diagram of a radio frame used in the LTE system. In the LTE system, orthogonal frequency division multiple access (OFDMA) and single carrier frequency division multiple access (SC-FDMA) are applied in the downlink and the uplink, respectively.

As illustrated in FIG. 3, the radio frame is configured of ten subframes arranged in a time direction. Each subframe is configured of two slots arranged in the time direction. A length of each subframe is 1 ms, and a length of each slot is 0.5 ms. Each subframe includes a plurality of resource blocks (RBs) in a frequency direction, and a plurality of symbols in the time direction. Each resource block includes a plurality of subcarriers in the frequency direction. One resource element (RE) is configured of one symbol and one subcarrier. In addition, a frequency resource can be specified by the resource block among radio resources (time and frequency resources) allocated to the UE 100, and a time resource can be specified by the subframe (or the slot).

In the downlink, an interval of several symbols at the head of each subframe is a region used as a physical downlink control channel (PDCCH) mainly configured to transmit a downlink control signal. Details of the PDCCH will be described later. In addition, the remaining portion of each subframe is a region that can be used as a physical downlink shared channel (PDSCH) mainly configured to transmit downlink data.

In the uplink, both ends in the frequency direction of each subframe are regions used as a physical uplink control channel (PUCCH) mainly configured to transmit an uplink control signal. The remaining portion of each subframe is a region that can be used as a physical uplink channel (PUSCH) mainly configured to transmit uplink data.

(Unlicensed Band)

In the LTE system according to the first embodiment, not only a licensed band for which a license has been granted to an operator but also an unlicensed band for which a license is unnecessary is used for LTE communication. Specifically, the unlicensed band is accessible with the aid of the licensed band. Such a mechanism is called licensed-assisted access (LAA).

Figure 4:
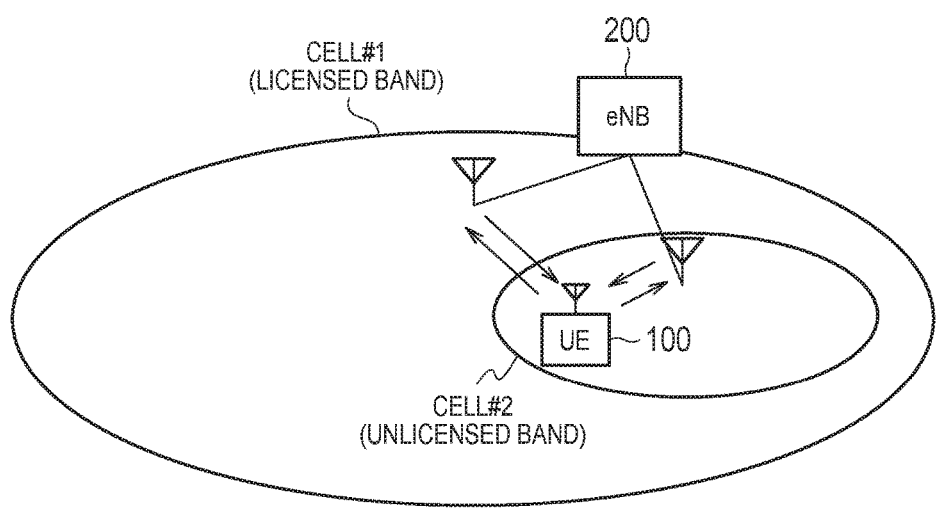
FIG. 4 is a view for describing an unlicensed band according to the first to eighth embodiments.

FIG. 4 is a diagram for describing the LAA. As illustrated in FIG. 4, the eNB 200 manages a cell #1 to be operated in the licensed band and a cell #2 to be operated in the unlicensed band. FIG. 4 illustrates an example in which the cell #1 is a macro the cell and the cell #2 is a small cell, but the cell size is not limited thereto.

The UE 100 is positioned in an overlapping area of the cell #1 and the cell #2. The UE 100 sets the cell #2 as a secondary cell (SCell) while setting the cell #1 as the primary cell (PCell) and performs communication using carrier aggregation (CA).

In the example of FIG. 4, the UE 100 performs uplink communication and downlink communication with the cell #1, and performs uplink communication and downlink communication with the cell #2. An unlicensed band radio resource is provided to the UE 100 in addition to a licensed band radio resource through such carrier aggregation, and thus, it is possible to improve throughput.

(User Terminal)

Figure 5:
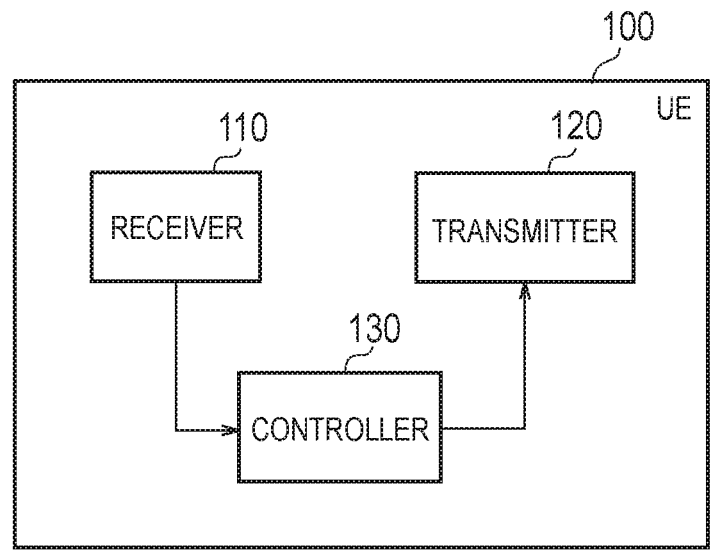
FIG. 5 is a block diagram of a user terminal (UE) according to the first to eighth embodiments.

Hereinafter, the UE 100 (user terminal) according to the first embodiment will be described. FIG. 5 is a block diagram illustrating a configuration of the UE 100. As illustrated in FIG. 5, the UE 100 includes a receiver 110, a transmitter 120, and a controller 130.

The receiver 110 performs various types of reception under control of the controller 130. The receiver 110 includes an antenna and a receiving machine. The receiving machine converts a radio signal received by the antenna to a baseband signal (reception signal) and outputs the converted signal to the controller 130. The receiver 110 may include a first receiving machine to receive a radio signal in the licensed band and a second receiving machine to receive a radio signal in the unlicensed band.

The transmitter 120 performs various types of transmission under control of the controller 130. The transmitter 120 includes an antenna and a transmitting machine. The transmitting machine converts a baseband signal (transmission signal) output from the controller 130 to a radio signal and transmits the converted signal from the antenna. The transmitter 120 may include a first transmitting machine to transmit a radio signal in the licensed band and a second transmitting machine to transmit a radio signal in the unlicensed band.

The controller 130 performs various types of control in the UE 100. The controller 130 includes a processor and a memory. The memory stores a program to be executed by the processor and information used for processing performed by the processor. The processor includes a baseband processor that performs modulation and demodulation, encoding and decoding, and the like of the baseband signal, and a central processing unit (CPU) that executes the program stored in the memory to perform various processes. The processor may include a codec to perform encoding and decoding of audio and video signals. The processor executes various processes to be described later and various communication protocols described above.

An overview of an operation of the UE 100 configured in this manner will be described.

The receiver 110 receives candidate timing information, which indicates a candidate timing of uplink transmission in an unlicensed band channel which is an unlicensed band frequency channel, from the eNB 200. In the first embodiment, the receiver 110 receives the candidate timing information transmitted from the eNB 200 via the licensed band.

The controller 130 determines a transmission timing to perform the uplink transmission to the eNB 200 from among the candidate timings indicated by the candidate timing information by monitoring the unlicensed band channel.

The transmitter 120 transmits uplink data to the eNB 200 via the unlicensed band channel at the determined transmission timing. The transmitter 120 may transmit the uplink data using the entire band of the unlicensed band channel.

(Base Station)

Figure 6:
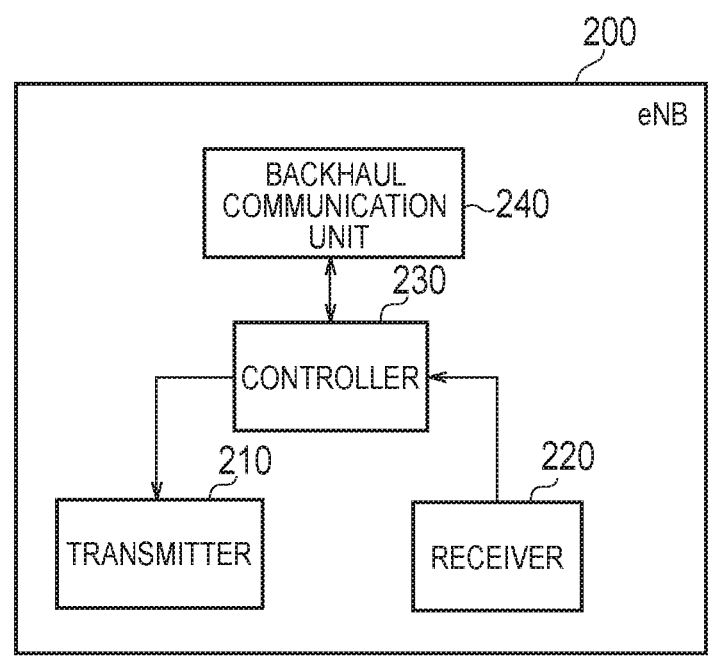
FIG. 6 is a block diagram of a base station (eNB) according to the first to eighth embodiments.

Hereinafter, a configuration of the eNB 200 (base station) will be described. FIG. 6 is a block diagram of the eNB 200. As illustrated in FIG. 6, the eNB 200 includes a transmitter 210, a receiver 220, a controller 230, and a backhaul communication unit 240.

The transmitter 210 performs various types of transmissions under control of the controller 230. The transmitter 210 includes an antenna and a transmitting machine. The transmitting machine converts a baseband signal (transmission signal) output from the controller 230 to a radio signal and transmits the converted signal from the antenna. The transmitter 210 may include a first transmitting machine that transmits a radio signal in the licensed band and a second transmitting machine that transmits a radio signal in the unlicensed band.

The receiver 220 performs various types of reception under control of the controller 230. The receiver 220 includes an antenna and a receiving machine. The receiving machine converts a radio signal received by the antenna into a baseband signal (reception signal) and outputs the converted signal to the controller 230. The receiver 220 may include a first receiving machine to receive a radio signal in the licensed band and a second receiving machine to receive a radio signal in the unlicensed band.

The controller 230 performs various types of control in the eNB 200. The controller 230 includes a processor and a memory. The memory stores a program to be executed by the processor and information used for processing performed by the processor. The processor includes a baseband processor that performs modulation and demodulation, encoding and decoding, and the like of the baseband signal, and a central processing unit (CPU) that executes the program stored in the memory to perform various processes. The processor executes various processes to be described later and various communication protocols described above.

The backhaul communication unit 240 is connected to the adjacent eNB 200 via the X2 interface and is connected to the MME/S-GW 300 via the S1 interface. The backhaul communication unit 240 is used for communication performed on the X2 interface, communication performed on the S1 interface, and the like.

An overview of an operation of the eNB 200 configured in this manner will be described.

The transmitter 210 transmits candidate timing information indicating a candidate timing of uplink transmission in the unlicensed band channel to the UE 100. In the first embodiment, the transmitter 210 transmits the candidate timing information to the UE 100 via the licensed band.

The receiver 220 receives uplink data from the UE 100 via the unlicensed band channel at the transmission timing determined by the UE 100 from among the candidate timings indicated by the candidate timing information. The receiver 220 may receive the uplink data transmitted using the entire band of the unlicensed band channel.

(Operation Sequence)

Figure 7:
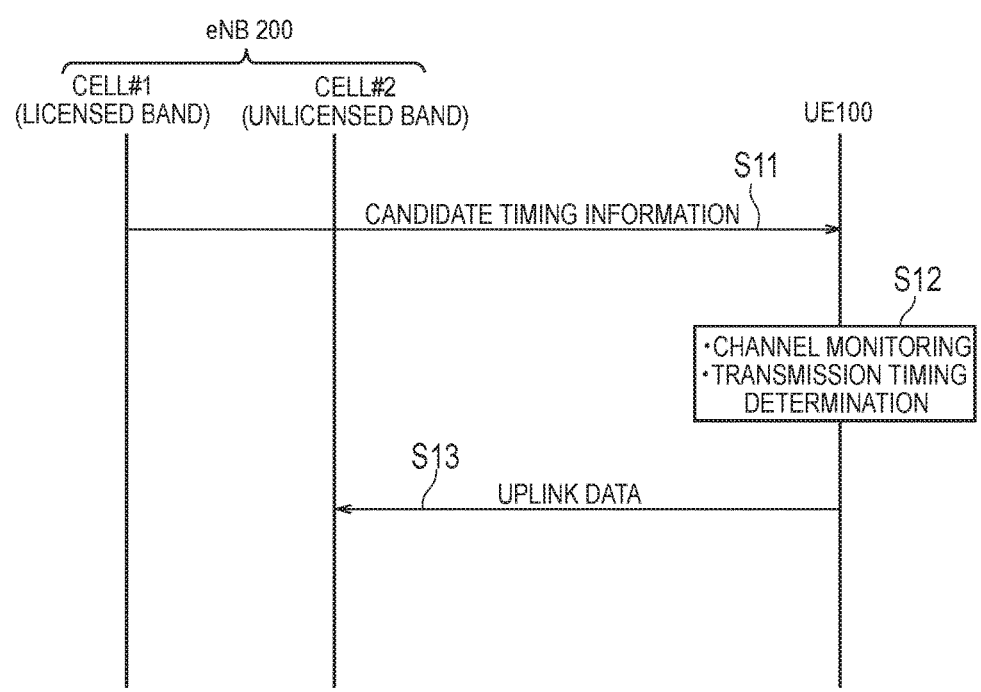
FIG. 7 is a view illustrating an operation sequence according to the first embodiment.

Hereinafter, an operation sequence according to the first embodiment will be described. FIG. 7 is a view illustrating the operation sequence according to the first embodiment.

As illustrated in FIG. 7, the eNB 200 transmits the candidate timing information to the UE 100 via the cell #1 operated in the licensed band in Step S11. The UE 100 receives the candidate timing information. The candidate timing information is information indicating the candidate timing of uplink transmission in the unlicensed band channel.

The candidate timing information may be TDD configuration information. When the unlicensed band channel is a TDD channel (TDD carrier), a composition ratio and a time position of a downlink subframe and an uplink subframe inside the radio frame can take various patterns (subframe configuration patterns). The TDD configuration information is information to designate one subframe configuration pattern among a plurality of subframe configuration patterns. In this case, the uplink subframe inside the radio frame corresponds to the candidate timing of uplink transmission.

Alternatively, the candidate timing information may be a bit map that indicates the candidate timing of uplink transmission in the unit of subframes. For example, a candidate subframe for uplink transmission is represented by "1" and a subframe for which uplink transmission is prohibited is represented by "0" inside one or a plurality of radio frames. When a first subframe is set to a "candidate subframe for uplink transmission" and second and third subframes are set to "uplink transmission-prohibited subframes", a bit map such as "1", "0", "0", and so on is obtained. The candidate timing information may include information indicating how long a pattern corresponding to the corresponding bitmap is valid (how many radio frames are valid). Alternatively, it may be preset for how long the pattern is valid.

Alternatively, the candidate timing information is information to designate a pattern of a combination of a radio frame (one or plural) and a subframe (one or plural) as a candidate timing of uplink transmission. A plurality of combination patterns are preset, and one combination pattern is designated by the candidate timing information. For example, a pattern including any radio frame (an odd number, an even number, or both) and any subframe (there are a plurality of choices from zero to nine) within the radio frame to designate a preferable transmission timing is set in advance. The candidate timing information is configured as an identifier to identify the pattern determined by the eNB 200. The candidate timing information may include information indicating how long the pattern is valid (how many radio frames are valid). Alternatively, it may be preset for how long the pattern is valid.

In the first embodiment, the eNB 200 may set (transmit) the candidate timing information to each of the UEs 100 such that the candidate timings do not overlap among the plurality of UEs 100 to which the LAA is applied. That is, a dedicated candidate timing is set for each of the UEs 100. In this case, the eNB 200 may transmit the candidate timing information to the UE 100 by unicast. For example, the candidate timing information is transmitted to the UE 100 using an individual RRC message.

Although an example in which the candidate timing is set in the unit of subframes has been described, the candidate timing may be set in the unit of slots (or even finer time units).

In Step S12, the UE 100 determines the transmission timing to perform the uplink transmission to the eNB 200 from among the candidate timings indicated by the candidate timing information by monitoring the unlicensed band channel. For example, the UE 100 confirms whether or not the unlicensed band channel is clear based on received power, and determines a timing at which a clear channel is confirmed among the candidate timings as the transmission timing.

In Step S13, the UE 100 transmits the uplink data to the eNB 200 via the unlicensed band channel at the transmission timing determined in Step S12. The UE 100 may transmit the uplink data using the entire band of the unlicensed band channel.

The eNB 200 receives the uplink data via the cell #2 (the unlicensed band). When a dedicated candidate timing is set for each of the UEs 100, the eNB 200 may identify the UE 100 that is a transmission source of the uplink data based on the timing of the uplink data.

Summary of First Embodiment

As described above, the UE 100 monitors the unlicensed band channel to determine the transmission timing to perform the uplink transmission to the eNB 200 from among the candidate timings indicated by the candidate timing information.

In this manner, the UE 100 autonomously determines the transmission timing so that a transmission delay is small or there is no transmission delay as compared with the general LTE uplink scheduling. Accordingly, it is possible to perform the appropriate uplink communication even in the unlicensed band in which the propagation environment drastically fluctuates.

In addition, it is possible to reduce the possibility that a plurality of UEs 100 determine the same transmission timing by limiting the selection of the transmission timing based on the candidate timing information.

In particular, the eNB 200 can identify each of the UEs 100 based on the transmission timing of each of the UEs 100 by setting the candidate timing information in each of the UEs 100 such that the candidate timings do not overlap among the plurality of UEs 100.

Modified Example of First Embodiment

In the above-described first embodiment, it is assumed a case where the unlicensed band channel used in the LAA is preset. However, the unlicensed band channel to be used in the LAA may be selectively set from among a plurality of frequency channels included in the unlicensed band.

For example, when the eNB 200 determines an unlicensed band channel to be used in the LAA, the eNB 200 transmits information indicating the unlicensed band channel to the UE 100 together with candidate timing information. The UE 100 uses the unlicensed band channel designated from the eNB 200 for uplink transmission. At the time, the UE 100 determines a transmission timing based on candidate timing information corresponding to the designated channel.

Alternatively, when the UE 100 determines the unlicensed band channel to be used in the LAA, the eNB 200 transmits the candidate timing information to the UE 100 for each of a plurality of unlicensed band channels. The UE 100 searches for a clear channel from among the plurality of unlicensed band channels and uses the searched channel for uplink transmission. At the time, the UE 100 determines a transmission timing based on candidate timing information corresponding to the searched channel.

Second Embodiment

A difference of a second embodiment from the first embodiment will be mainly described.

In the second embodiment, the transmitter 120 of the UE 100 transmits a notification signal, which indicates that uplink data is transmitted via an unlicensed band channel, to the eNB 200 via a licensed band.

In the second embodiment, the receiver 220 of the eNB 200 receives the notification signal, which indicates that the uplink data is transmitted via the unlicensed band channel, from the UE 100 via the licensed band.

Figure 8:
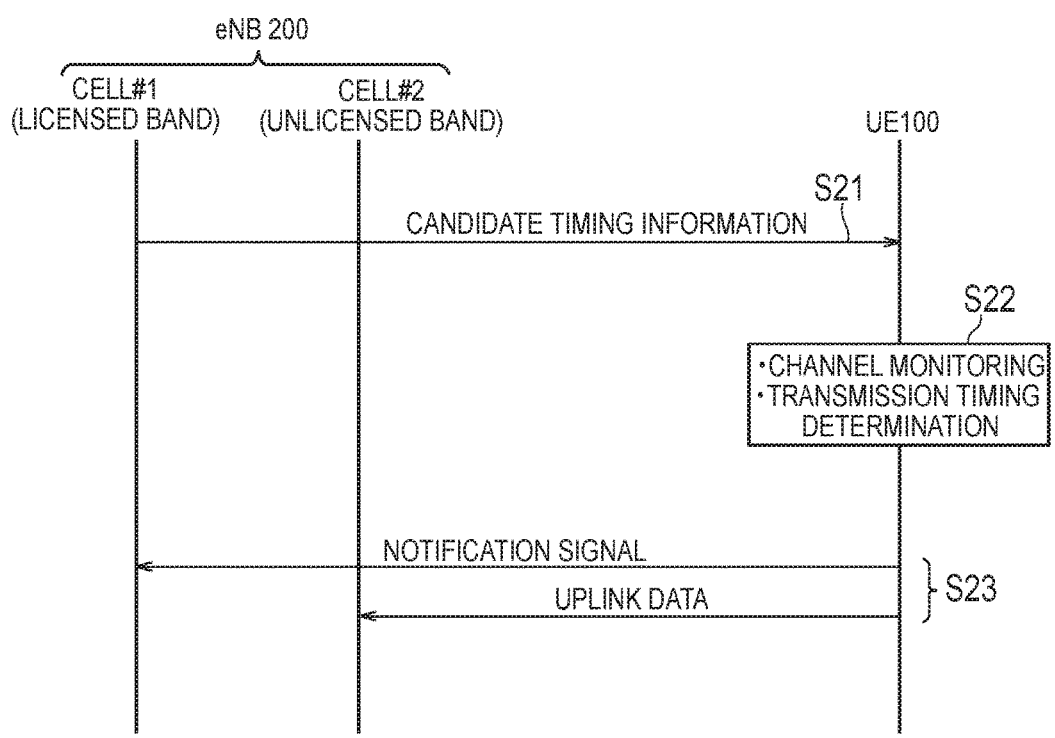
FIG. 8 is a view illustrating an operation sequence according to the second embodiment.

FIG. 8 is a view illustrating an operation sequence according to the second embodiment.

As illustrated in FIG. 8, operations of Steps S21 and S22 are the same as those of the first embodiment. However, a dedicated candidate timing is not necessarily set for each of the UEs 100 in the second embodiment. In addition, the eNB 200 may transmit information indicating a resource (a radio resource, a signal sequence, or the like) to be used for transmission of the notification signal to the UE 100.

In the second embodiment, the eNB 200 may transmit candidate timing information by broadcast instead of transmitting the candidate timing information by unicast. For example, the candidate timing information is transmitted to the UE 100 using a common RRC message (for example, SIB).

After the transmission timing of uplink data is determined, the UE 100 transmits the notification signal to the eNB 200 via the cell #1 (licensed band) in Step S23. The eNB 200 receives the notification signal. The eNB 200 performs processing (preparation) for reception of the uplink data from the UE 100 based on the notification signal.

Then, the UE 100 transmits the uplink data to the eNB 200 via the cell #2 (unlicensed band). The UE 100 may transmit the uplink data using the entire band of the unlicensed band channel.

In this sequence, the UE 100 transmits the notification signal at the same time as the transmission of the uplink data or immediately before the transmission of the uplink data. The notification signal may be a signal (a synchronization signal or a reference signal) added to a head position of the uplink data. Alternatively, the notification signal may be a control signal transmitted on the PUCCH. A resource dedicated to the UE may be used for transmission of these signals.

Alternatively, the UE 100 may transmit the notification signal at a timing earlier than the transmission of the uplink data by a predetermined offset time. The offset time may be preset or may be designated by the eNB 200.

Alternatively, the UE 100 may transmit the notification signal at a timing later than the transmission of the uplink data by a predetermined offset time. In this case, the eNB 200 stores the received uplink data and waits for reception of the notification signal. If the offset time has elapsed without receiving the notification signal, the stored uplink data is discarded. The offset time may be preset or may be designated by the eNB 200.

In this manner, the UE 100 transmits the notification signal, which indicates that uplink data is transmitted via the unlicensed band channel, to the eNB 200 via the licensed band according to the second embodiment. As a result, the eNB 200 can properly receive the uplink data even when the UE 100 determines the transmission timing of uplink data. In addition, the eNB 200 can identify each of the UEs 100 based on the notification signal.

Third Embodiment

A difference of a third embodiment from the first embodiment and the second embodiment will be mainly described.

In the third embodiment, the transmitter 120 of the UE 100 transmits identification information of the UE 100 together with uplink data via an unlicensed band channel.

In the third embodiment, the receiver 220 of the eNB 200 receives the identification information of the UE 100 together with the uplink data via the unlicensed band channel.

Figure 9:
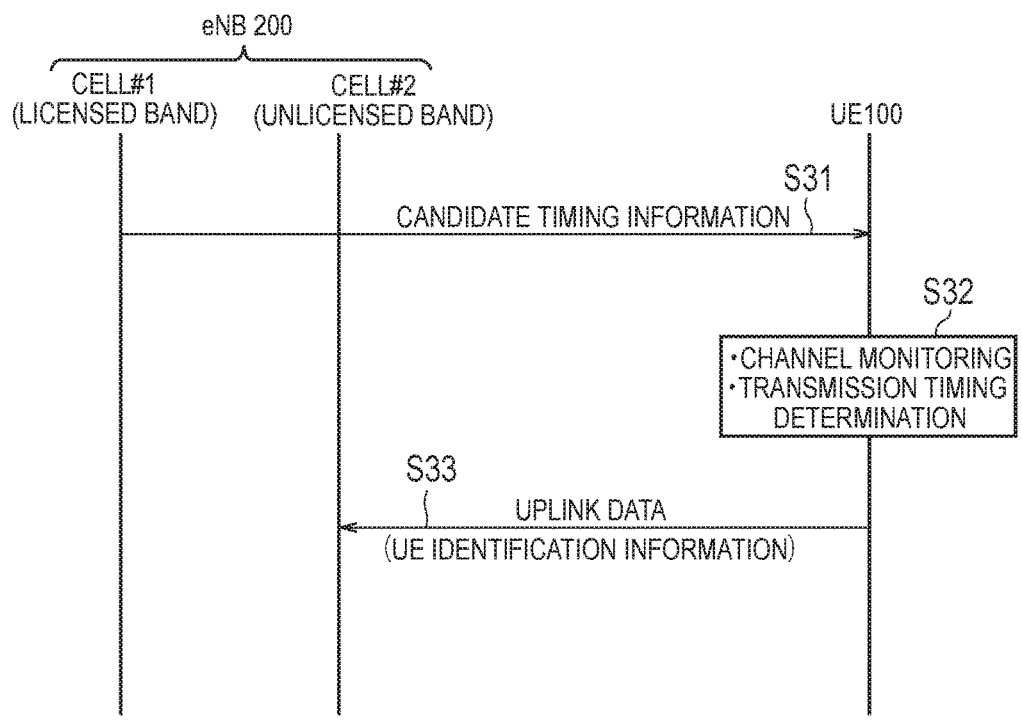
FIG. 9 is a view illustrating an operation sequence according to the third embodiment.

FIG. 9 is a view illustrating an operation sequence according to the third embodiment.

As illustrated in FIG. 9, the operations of Steps S31 and S32 are the same as those of the first embodiment. However, in the third embodiment, the eNB 200 may transmit the candidate timing information by broadcast instead of transmitting the candidate timing information by unicast.

In Step S33, the UE 100 transmits the uplink data to the eNB 200 via the cell #2 (unlicensed band). At the time, the UE 100 adds the identification information of the own UE 100 to the uplink data.

The identification information of the UE 100 may be a cell-radio network temporary identifier (C-RNTI) which the eNB 200 has allocated to the UE 100. The identification information of the own UE 100 may be added as a header at the head of the uplink data. The header is designed such that any eNB 200 and any UE 100 can be decoded.

The eNB 200 receives the identification information of the UE 100 together with the uplink data from the UE 100. The eNB 200 identifies the UE 100 based on the identification information.

In this manner, the UE 100 transmits identification information of the UE 100 together with uplink data via an unlicensed band channel according to the third embodiment. As a result, the eNB 200 can properly identify each of the UEs 100 based on the notification signal even when the UE 100 determines the transmission timing of uplink data.

Modified Example of Third Embodiment

A fact that the identification information of the UE 100 is known to a third party is likely to be undesirable from the viewpoint of security.

Accordingly, the transmitter 120 of the UE 100 transmits uplink data scrambled with identification information (for example, a C-RNTI) of the own UE 100 via an unlicensed band channel in a modified example of the third embodiment. Specifically, CRC bits of the uplink data are scrambled with the identification information of the own UE 100. Alternatively, not only the CRC bits but also the entire uplink data may be scrambled.

In the modified example of the third embodiment, the receiver 220 of the eNB 200 receives the uplink data scrambled with the identification information of the UE 100 via the unlicensed band channel. Further, an attempt for decoding of the CRC bit (and the uplink data) is made according to the identification information of each candidate UE 100, and the UE 100 which is a transmission source of the uplink data is identified based on the identification information at the time of succeeding in decoding.

Fourth Embodiment

A difference of a fourth embodiment from the first to third embodiments will be mainly described.

In the first to third embodiments described above, a case where the candidate timing information is transmitted and received through the RRC message has been mainly assumed. On the contrary, the fourth embodiment is an embodiment in which candidate timing information is transmitted and received through signaling of a physical layer instead of signaling of an RRC layer. When the candidate timing information is transmitted and received through such signaling of the physical layer, it is possible to perform dynamic scheduling as compared with the case of using the signaling of the RRC layer.

In the fourth embodiment, the transmitter 210 of the eNB 200 transmits the candidate timing information to the UE 100 via a physical downlink control channel (PDCCH). The receiver 110 of the UE 100 receives the candidate timing information from the eNB 200 via the PDCCH. For example, the candidate timing information is included in "UL grant" indicating an uplink allocation resource. The candidate timing information may be information indicating a plurality of candidate timings (for example, a plurality of subframes). The candidate timing information may be information indicating a period including of a plurality of consecutive candidate timings (for example, a plurality of consecutive subframes). In this case, the candidate timing information may include information indicating the number of consecutive candidate timings. Although an example in which the candidate timing is set in the unit of subframes has been described, the candidate timing may be set in the unit of slots (or even finer time units).

In the fourth embodiment, uplink data is transmitted from the UE 100 using the entire band of the unlicensed band channel. Alternatively, the unlicensed band channel is frequency-divided, and the uplink data is transmitted using a specific frequency domain of the unlicensed band channel. The transmitter 210 of the eNB 200 transmits the candidate timing information instead of transmitting the information indicating a resource block that needs to be used for uplink transmission. The receiver 110 of the UE 100 receives the candidate timing information instead of receiving the information indicating the resource block that needs to be used for the uplink transmission. In this manner, it is possible to transmit the candidate timing information instead of requiring a bit for designating the resource block. Incidentally, a PDCCH format of a PDCCH to designate an unlicensed band may be the same as a PDCCH format of a PDCCH to designate a licensed band. The PDCCH format may be "PDCCH format 0". In this case, the UE 100 may read and interpret the bit for designating the resource block of the PDCCH to designate the unlicensed band as the candidate timing information.

Figure 10:
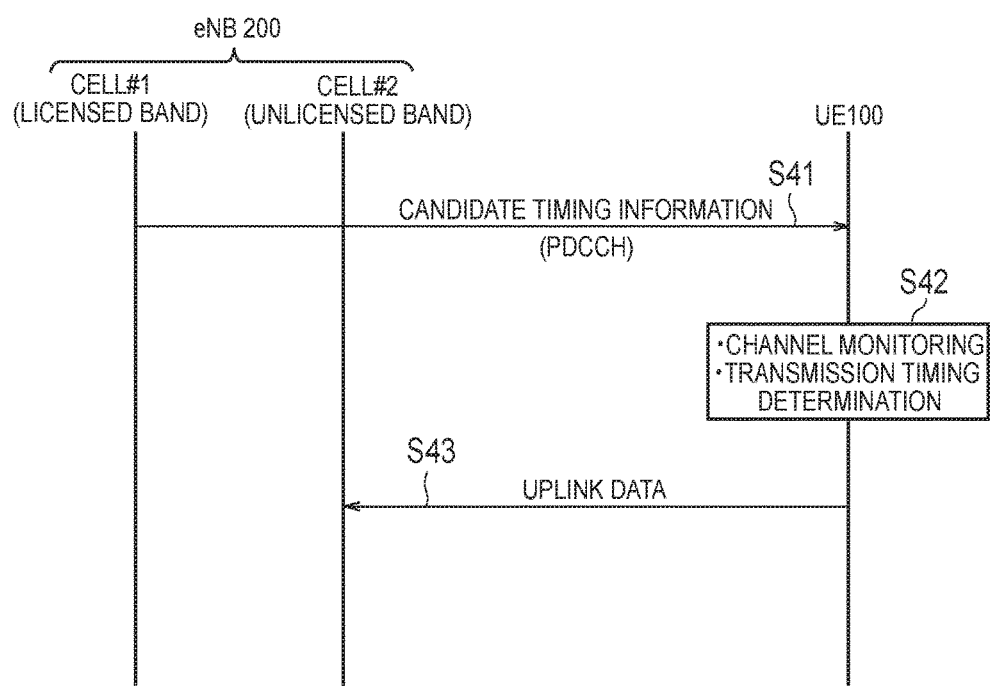
FIG. 10 is a view illustrating an operation sequence according to the fourth embodiment.

FIG. 10 is a view illustrating an operation sequence according to the fourth embodiment.

As illustrated in FIG. 10, the eNB 200 transmits the candidate timing information to the UE 100 via a PDCCH of the cell #1 operated in the licensed band in Step S41. The UE 100 receives the candidate timing information via the PDCCH of the cell #1.

In Step S42, the UE 100 determines the transmission timing to perform the uplink transmission to the eNB 200 from among the candidate timings indicated by the candidate timing information by monitoring (LBT) the unlicensed band channel.

In Step S43, the UE 100 transmits the uplink data to the eNB 200 via the unlicensed band channel at the determined transmission timing. The eNB 200 receives the uplink data via the cell #2 (the unlicensed band).

Fifth Embodiment

A difference of a fifth embodiment from the first to fourth embodiments will be mainly described.

In the first to fourth embodiments described above, no particular consideration has been given to an uplink HARQ. A general uplink HARQ is a synchronous HARQ. That is, a timing of retransmission with respect to a timing of initial transmission is defined, and periodic retransmission is performed with the timing of initial transmission as a start timing. Thus, an HARQ process (retransmission process) is identified based on the retransmission timing (a retransmission subframe).

However, it is not always possible to perform retransmission at a defined cycle in the unlicensed band where the LBT is required, and it is difficult to identify the HARQ process based on the retransmission timing.

In addition, a redundancy version (RV) is changed each time data is transmitted in the general uplink HARQ. For example, an RV of initial transmission data is "0", an RV of first retransmission data is "3", an RV of second retransmission data is "2", and an RV of third retransmission data is "1".

However, it is not always possible to perform retransmission at the defined cycle in the unlicensed band where the LBT is required, and it is difficult to identify which number of retransmission is being performed.

Thus, the transmitter 120 of the UE 100 transmits HARQ information indicating the HARQ process and/or the RV corresponding to the uplink data to the eNB 200 in the fifth embodiment. Specifically, the HARQ information includes an identifier (HARQ process ID) of the HARQ process and/or an index of the RV (redundancy version index). The receiver 220 of the eNB 200 receives the HARQ information indicating the HARQ process and/or the RV corresponding to the uplink data from the UE 100. The HARQ information may further include a new data indicator (NDI) to identify whether the data is new data or retransmission data.

When "HARQ process ID" and/or "redundancy version index" corresponding to the uplink data is transmitted from the UE 100 to the eNB 200, the eNB 200 can identify the HARQ process and/or the RV corresponding to the uplink data.

The HARQ information is included in a part of the uplink data. Alternatively, the HARQ information may be included in a reference signal (DMRS: Demodulation Reference Signal) to be transmitted together with the uplink data. Alternatively, the HARQ information may be multiplexed with the uplink data channel (PUSCH) in the same manner as current uplink control information (UCI).

Figure 11:
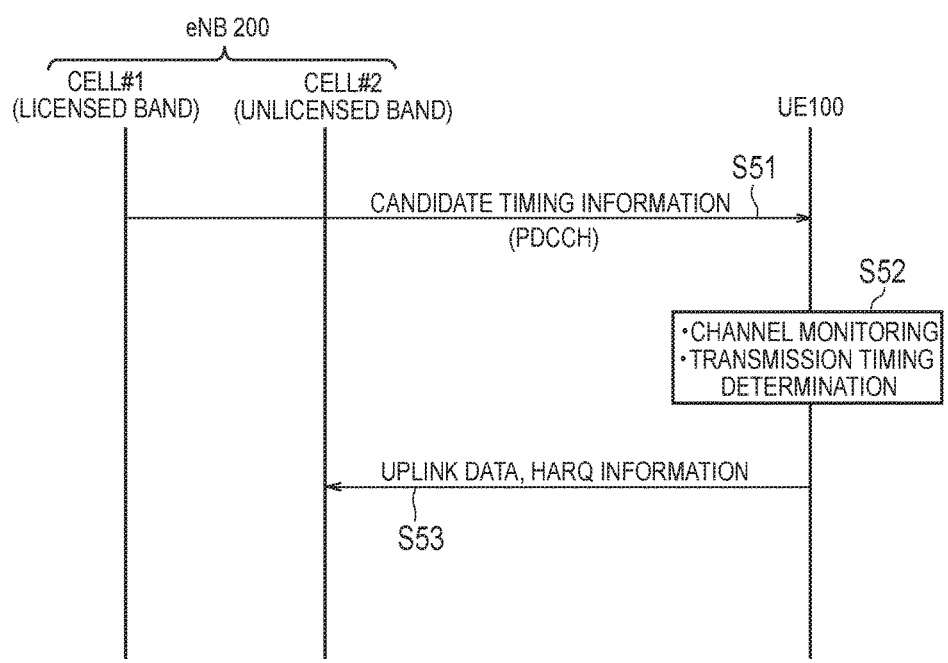
FIG. 11 is a view illustrating an operation sequence according to the fifth embodiment.

FIG. 11 is a view illustrating an operation sequence according to the fifth embodiment.

As illustrated in FIG. 11, the eNB 200 transmits the candidate timing information to the UE 100 via a PDCCH of the cell #1 operated in a licensed band in Step S51. The UE 100 receives the candidate timing information via the PDCCH of the cell #1. However, the candidate timing information may be transmitted and received using an RRC message.

In Step S52, the UE 100 determines the transmission timing to perform the uplink transmission to the eNB 200 from among the candidate timings indicated by the candidate timing information by monitoring (LBT) an unlicensed band channel.

In Step S53, the UE 100 transmits the uplink data to the eNB 200 via the unlicensed band channel at the determined transmission timing. In addition, the UE 100 transmits the HARQ information indicating the HARQ process and/or the RV corresponding to the uplink data to the eNB 200. The eNB 200 receives the uplink data and the HARQ information via the cell #2 (unlicensed band).

Modified Example of Fifth Embodiment

A correspondence between the RV and a subframe number may be defined in advance instead of transmitting the index of the RV (redundancy version index) from the UE 100 to the eNB 200. For example, the UE 100 transmits uplink data based on an RV corresponding to a transmission timing (subframe number) determined by the LBT. The eNB 200 identifies the RV of the uplink data based on the transmission timing (subframe number).

Sixth Embodiment

A difference of a sixth embodiment from the first to fifth embodiments will be mainly described.

In the fifth embodiment described above, the HARQ information ("HARQ process ID" and/or "redundancy version index") is transmitted from the UE 100 to the eNB 200. On the contrary, the eNB 200 designates an HARQ process and/or an RV for the UE 100 in the sixth embodiment.

In the sixth embodiment, the transmitter 210 of the eNB 200 transmits HARQ information indicating the HARQ process and/or the RV associated with candidate timing information to the UE 100. The HARQ information includes an identifier (HARQ process ID) of the HARQ process and/or an index of the RV (redundancy version index). The receiver 110 of the UE 100 receives the HARQ information indicating the HARQ process and/or the RV associated with the candidate timing information from the eNB 200.

The transmitter 120 of the UE 100 transmits uplink data according to the HARQ information at a transmission timing determined from among candidate timings. The receiver 220 of the eNB 200 receives the uplink data according to the HARQ information at the transmission timing determined by the UE 100.

Figure 12:
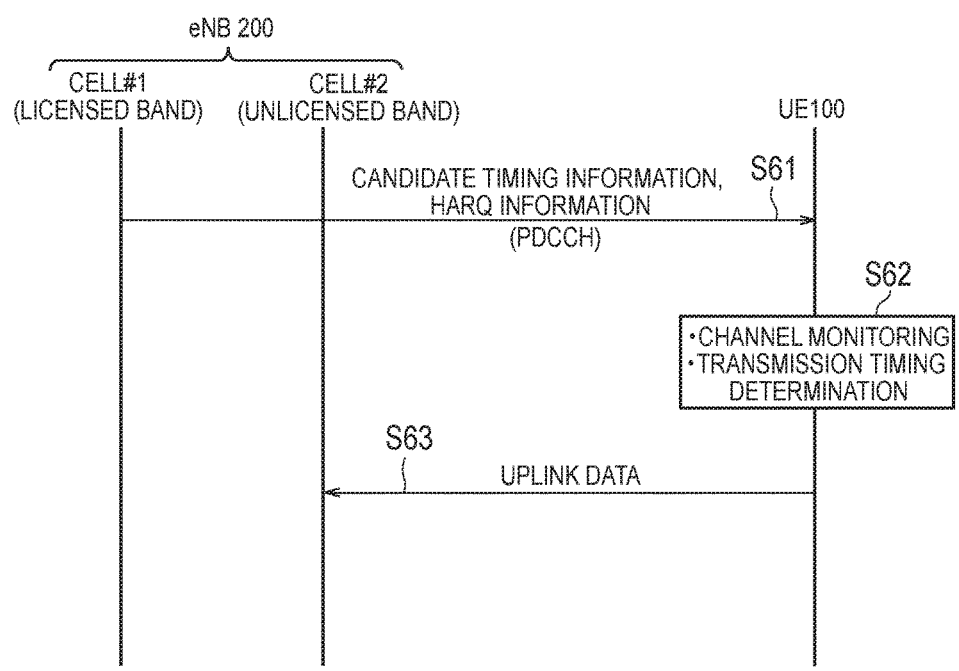
FIG. 12 is a view illustrating an operation sequence according to the sixth embodiment.

FIG. 12 is a view illustrating an operation sequence according to the sixth embodiment.

As illustrated in FIG. 12, the eNB 200 transmits the candidate timing information and the HARQ information to the UE 100 via a PDCCH of the cell #1 operated in a licensed band in Step S61. The UE 100 receives the candidate timing information and the HARQ information via the PDCCH of the cell #1. However, the candidate timing information and the HARQ information may be transmitted and received using an RRC message.

In Step S62, the UE 100 determines the transmission timing to perform the uplink transmission to the eNB 200 from among the candidate timings indicated by the candidate timing information by monitoring (LBT) an unlicensed band channel.

In Step S63, the UE 100 transmits the uplink data corresponding to the HARQ process and/or the RV indicated by the HARQ information to the eNB 200 via the unlicensed band channel at the determined transmission timing. The eNB 200 receives the uplink data via the cell #2 (the unlicensed band). The eNB 200 identifies the HARQ process and/or the RV corresponding to the uplink data based on a reception timing of the uplink data.

Modified Example of First Embodiment to Sixth Embodiment

In the first to sixth embodiments described above, it is mainly assumed a case where the candidate timing information is the information indicating the plurality of candidate timings (for example, the plurality of subframes), and the UE 100 determines one transmission timing (for example, one subframe) from among the plurality of candidate timings by the LBT. However, the UE 100 may determine two or more transmission timings (for example, two or more subframes) by the LBT from among the plurality of candidate timings indicated by the candidate timing information.

Figure 13A:
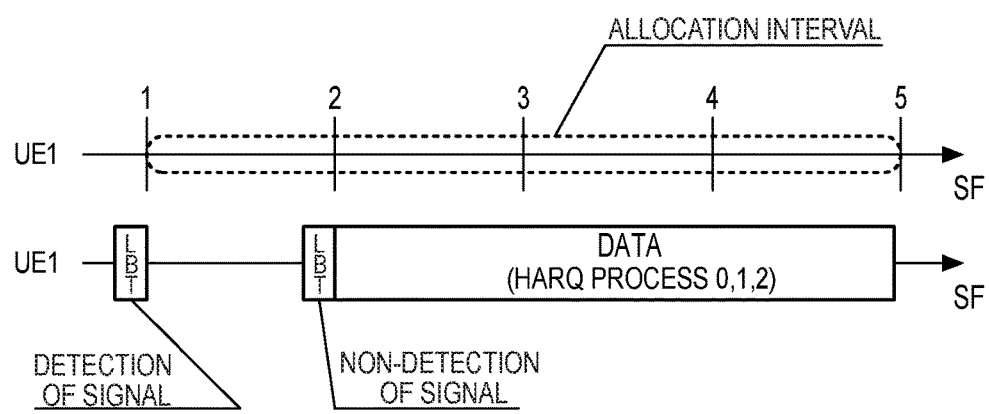
FIG. 13 is a view for describing a modified example of the first to sixth embodiments.
Figure 13B:
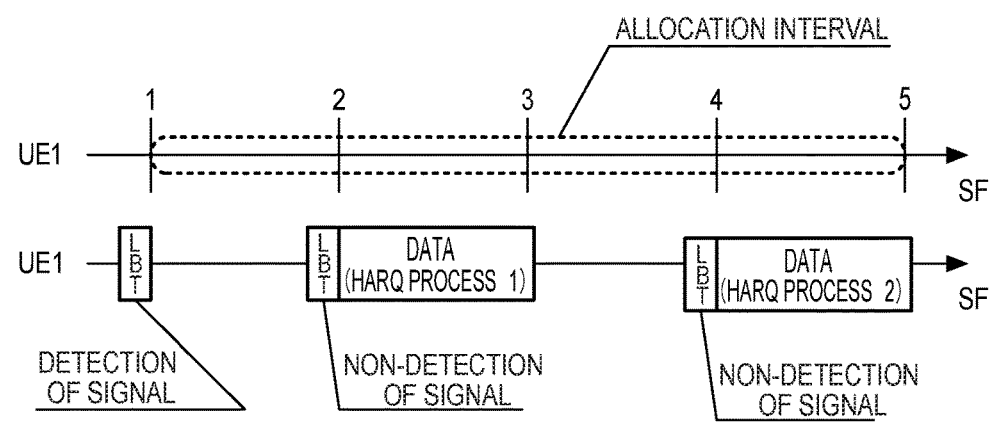

FIG. 13 is a view for describing an operation illustrated in the present modified example. As illustrated in FIGS. 13(*a*) and 13(*b*), the eNB 200 allocates a period (allocation interval) including consecutive subframes (sf) 1 to 4 to the UE 100 (UE 1). Specifically, candidate timing information 1 indicating the allocation interval is transmitted to the UE 100 (UE 1).

As illustrated in FIG. 13(*a*), the UE 100 (UE 1) monitors (LBT) an unlicensed band channel immediately before the subframe 1. In this LBT, the UE 100 (UE 1) detects a signal from other device and determines that the subframe 1 is not used for uplink transmission. Next, the UE 100 (UE 1) detects no signal from other device for the subframe 2, determines to use the subframes 2 to 4 for uplink transmission, and consecutively transmits uplink data to the eNB 200 in the subframes 2 to 4. Incidentally, FIG. 13(*a*) illustrates an example in which the HARQ process is performed differently in each of the subframes 2 to 4. Specifically, the subframe 2 corresponds to an HARQ process 0, the subframe 3 corresponds to an HARQ process 1, and the subframe 4 corresponds to an HARQ process 2.

On the other hand, the UE 100 (UE 1) monitors (LBT) the unlicensed band channel immediately before the subframe 1 as illustrated in FIG. 13(*b*). In this LBT, the UE 100 (UE 1) detects a signal from other device and determines that the subframe 1 is not used for uplink transmission. Next, the UE 100 (UE 1) detects no signal from other device for the subframe 2, determines to use the subframe 2 for the uplink transmission, and transmits the uplink data to the eNB 200 in the subframe 2. Further, the UE 100 (UE 1) detects no signal from other device for the subframe 4, determines to also use the subframe 4 for the uplink transmission, and transmits the uplink data to the eNB 200 in the subframe 4, too. Incidentally, FIG. 13(*b*) illustrates an example in which the HARQ process is performed differently in each of the subframes 2 and 4. Specifically, the subframe 2 corresponds to the HARQ process 1, and the subframe 4 corresponds to the HARQ process 2.

When the data transmission as illustrated in FIGS. 13(*a*) and 13(*b*) is performed, the UE 100 may transmit the identifier (HARQ process ID) of the HARQ process corresponding to each subframe together with the uplink data in the fifth embodiment described above. In addition, when the RVs are set to be different for each subframe, the UE 100 may transmit the index (redundancy version index) of the RV corresponding to each subframe together with the uplink data.

In addition, the eNB 200 may designate a plurality of HARQ processes and/or a plurality of RVs for the UE 100 when the data transmission as illustrated in FIGS. 13(*a*) and 13(*b*) is performed in the above-described sixth embodiment. Specifically, the eNB 200 transmits identifiers of the plurality of HARQ processes associated with the candidate timing information to the UE 100 through the PDCCH. The eNB 200 may further transmit allocation priorities of the plurality of HARQ processes. The UE 100 preferentially transmits the HARQ process with a higher priority. In addition, the eNB 200 may transmit indices of the plurality of RVs associated with the candidate timing information to the UE 100 through the PDCCH.

Seventh Embodiment

A difference of a seventh embodiment from the first to sixth embodiments will be mainly described.

In the fifth embodiment and the sixth embodiment described above, the HARQ information ("HARQ process ID" and/or "redundancy version index") is transmitted and received between the UE 100 and the eNB 200. On the contrary, transmission and reception of HARQ information is not performed in the seventh embodiment.

In the seventh embodiment, candidate timing information is information indicating a period including a plurality of candidate timings (for example, a plurality of subframes). The transmitter 120 of the UE 100 transmits uplink data corresponding to only one HARQ process and/or one RV within the period. The receiver 220 of the eNB 200 receives the uplink data corresponding to only one HARQ process and/or one RV within the period. Accordingly, it is possible to identify the HARQ process and/or the RV corresponding to the uplink data without transmitting and receiving the HARQ information.

Figure 14A:
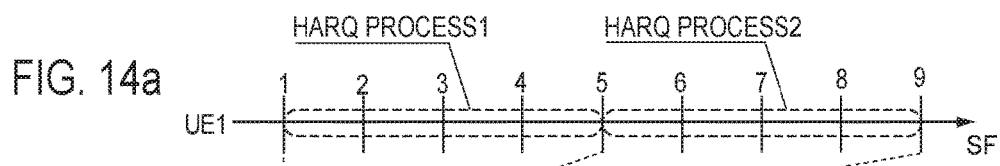
FIG. 14 is a view illustrating a scheduling operation according to the seventh embodiment.
Figure 14B:
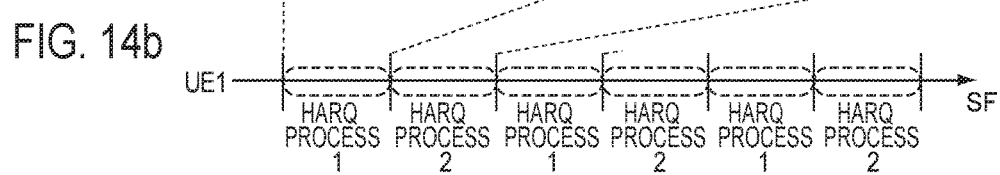

FIG. 14 is a view illustrating a scheduling operation according to the seventh embodiment.

As illustrated in FIG. 14(*a*), the eNB 200 allocates a period (allocation interval 1) including consecutive subframes (sf) 1 to 4 to the UE 100 (UE 1). Specifically, candidate timing information 1 indicating the allocation interval 1 is transmitted to the UE 100 (UE 1).

In addition, the eNB 200 assigns a period (allocation interval 2) including consecutive subframes (sf) 5 to 8 to the UE 100 (UE 1). Specifically, candidate timing information 2 indicating the allocation interval 2 is transmitted to the UE 100 (UE 1).

As illustrated in FIG. 14(*b*), the UE 100 (UE 1) monitors (LBT) an unlicensed band channel within the allocation interval 1 to determine a transmission timing (subframe) to perform uplink transmission to the eNB 200. Then, the UE 100 (UE 1) transmits uplink data corresponding to only one HARQ process (HARQ process 1).

In addition, the UE 100 (UE 1) monitors (LBT) the unlicensed band channel within the allocation interval 2 indicated by the candidate timing information 2 to determine a transmission timing (subframe) to perform the uplink transmission to the eNB 200. Then, the UE 100 (UE 1) transmits uplink data corresponding to only one HARQ process (HARQ process 2).

For example, "HARQ process ID" is determined based on the following formula. When "mod 2" is set, "HARQ process ID" have two values of "1" and "2".

$$\text{HARQ process ID} = ((SFN*10+\text{subframe})/4) \bmod 2 + 1 \quad (1)$$

Here, "SFN" is a number of a system frame (radio frame). Further, "subframe" is a number of a subframe.

Alternatively, 'UE_ID mod Offset' may be introduced in Formula (1) in order for shift for each UE as expressed in the following formula.

$$\text{HARQ process ID} = ((SFN*10+\text{subframe}+(UE\_ID \bmod \text{Offset}))/4) \bmod 2 + 1 \quad (2)$$

Here, "UE_ID" is a UE-specific identifier. Further, "offset" is a constant for differentiating the UE.

In addition, the UE 100 (UE 1) transmits uplink data corresponding to one subframe within each allocation interval. The uplink data is uplink data corresponding to one HARQ process and one RV.

Figure 15A:
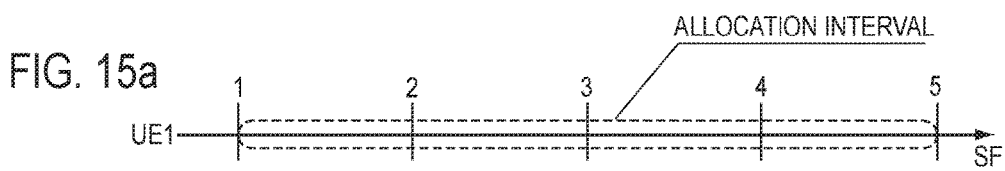
FIG. 15 is a view illustrating Operation Example 1 of the UE according to the seventh embodiment.
Figure 15B:
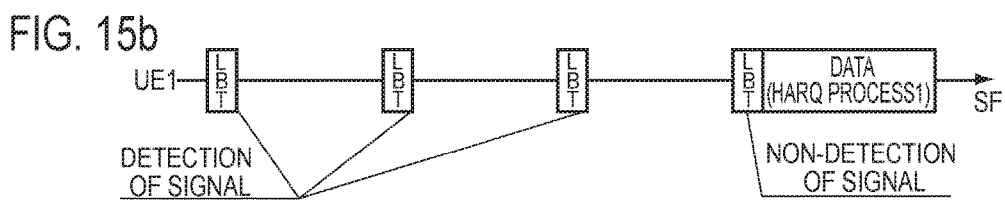

FIG. 15 is a view illustrating Operation Example 1 of the UE 100 according to the seventh embodiment.

As illustrated in FIG. 15(*a*), the allocation interval 1 including the consecutive subframes (sf) 1 to 4 is assigned to the UE 100 (UE 1) by the eNB 200.

As illustrated in FIG. 15(*b*), the UE 100 (UE 1) monitors (LBT) an unlicensed band channel immediately before the subframe 1. Specifically, the UE 100 confirms whether or not the unlicensed band channel is clear based on received power. In this LBT, the UE 100 (UE 1) detects a signal from other device and determines that the subframe 1 is not used for uplink transmission. In addition, the UE 100 (UE 1) detects a signal from other device for each of the subframes 2 and 3 and determines not to use the subframes 2 and 3 for uplink transmission. On the other hand, the UE 100 (UE 1) detects no signal from other device for the subframe 4, determines to use the subframe 4 for the uplink transmission, and transmits the uplink data to the eNB 200 in the subframe 4.

Figure 16A:
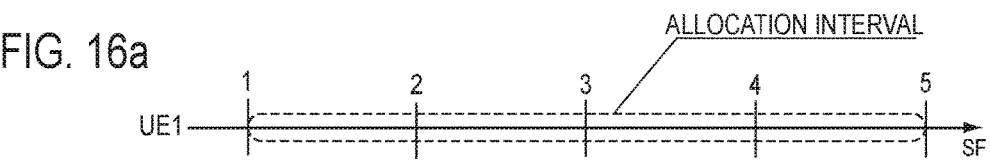
FIG. 16 is a view illustrating Operation Example 2 of the UE according to the seventh embodiment.
Figure 16B:
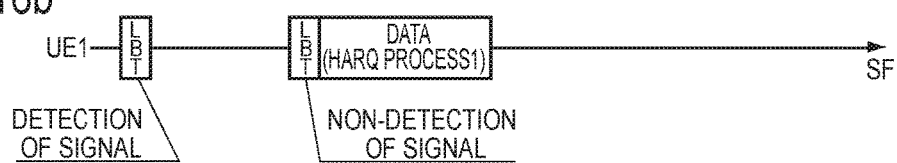

FIG. 16 is a view illustrating Operation Example 2 of the UE 100 according to the seventh embodiment.

As illustrated in FIG. 16(*a*), the allocation interval 1 including the consecutive subframes (sf) 1 to 4 is assigned to the UE 100 (UE 1) by the eNB 200.

As illustrated in FIG. 16(*b*), the UE 100 (UE 1) monitors (LBT) an unlicensed band channel immediately before the subframe 1. Specifically, the UE 100 confirms whether or not the unlicensed band channel is clear based on received power. In this LBT, the UE 100 (UE 1) detects a signal from other device and determines that the subframe 1 is not used for uplink transmission. Next, the UE 100 (UE 1) detects no signal from other device for the subframe 2, determines to use the subframe 2 for the uplink transmission, and transmits the uplink data to the eNB 200 in the subframe 2. In this case, the UE 100 does not perform the LBT and the uplink transmission in the remaining allocation interval.

Eighth Embodiment

A difference of an eighth embodiment from the first to seventh embodiments will be mainly described. The eighth embodiment is an embodiment relating to scheduling of the allocation interval on the premise of the seventh embodiment.

In the eighth embodiment, the transmitter 210 of the eNB 200 transmits first candidate timing information to a first UE 100 and transmits second candidate timing information to a second UE 100. The first candidate timing information is information indicating a first period (allocation interval 1) including a plurality of candidate timings. The second candidate timing information is information indicating a second period (allocation interval 2) including a plurality of candidate timings. Some candidate timings included in the first period overlap some candidate timings included in the second period.

Figure 17A:
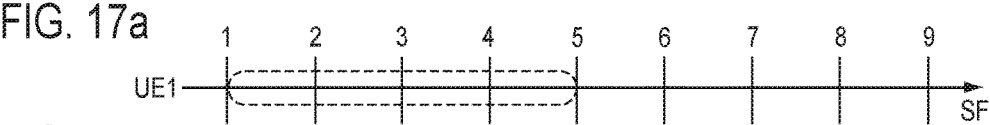
FIG. 17 is a view illustrating a scheduling operation according to the eighth embodiment.
Figure 17B:
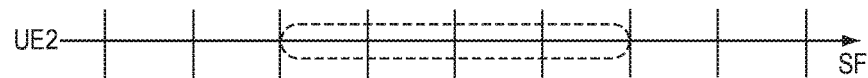
Figure 17C:
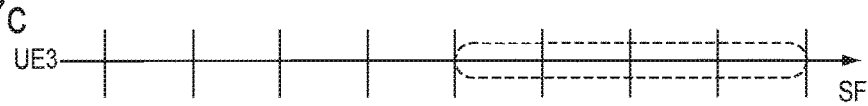

FIG. 17 is a view illustrating a scheduling operation according to the eighth embodiment.

As illustrated in FIG. 17(*a*), the eNB 200 assigns a period (allocation interval 1) including consecutive subframes (sf) 1 to 4 to the UE 100 (UE 1). Specifically, candidate timing information 1 indicating the allocation interval 1 is transmitted to the UE 100 (UE 1).

As illustrated in FIG. 17(*b*), eNB 200 assigns a period (allocation interval 2) including consecutive subframes (sf) 3 to 6 to the UE 100 (UE 2). Specifically, candidate timing information 2 indicating the allocation interval 2 is transmitted to the UE 100 (UE 2).

As illustrated in FIG. 17(*c*), the eNB 200 allocates a period (allocation interval 3) including consecutive subframes (sf) 5 to 8 to the UE 100 (UE 3). Specifically, candidate timing information 3 indicating the allocation interval 3 is transmitted to the UE 100 (UE 3).

As illustrated in FIGS. 17(*a*) and 17(*b*), the subframes 3 and 4 overlap between the allocation interval 1 of the UE 1 and the allocation interval 2 of the UE 2. As illustrated in FIGS. 17(*b*) and 17(*c*), the subframes 5 and 6 overlap between the allocation interval 2 of the UE 2 and the allocation interval 3 of the UE 3.

Figure 18A:
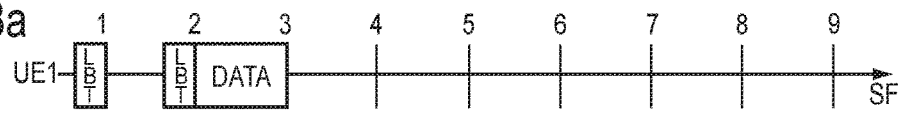
FIG. 18 is a view illustrating an operation example of the UE according to the eighth embodiment.
Figure 18B:
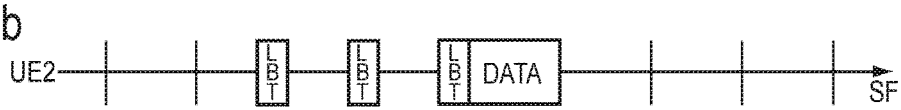
Figure 18C:
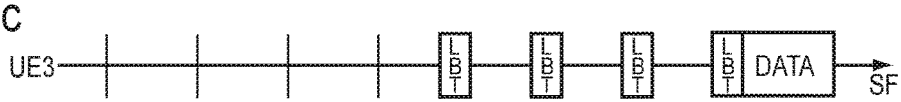

FIG. 18 is a view illustrating an operation example of the UE 100 according to the eighth embodiment.

As illustrated in FIG. 18(*a*), the UE 100 (UE 1) monitors (LBT) an unlicensed band channel immediately before the subframe 1. In this LBT, the UE 100 (UE 1) detects a signal from other device and determines that the subframe 1 is not used for uplink transmission. Next, the UE 100 (UE 1) detects no signal from other device for the subframe 2, determines to use the subframe 2 for the uplink transmission, and transmits the uplink data to the eNB 200 in the subframe 2.

As illustrated in FIG. 18(*b*), the UE 100 (UE 2) monitors (LBT) the unlicensed band channel immediately before the subframe 3. In this LBT, the UE 100 (UE 2) detects a signal from other device (UE 1) and determines not to use the subframe 3 for uplink transmission. In addition, the UE 100 (UE 2) monitors (LBT) the unlicensed band channel immediately before the subframe 4. In this LBT, the UE 100 (UE 4) detects a signal from other device and determines not to use the subframe 4 for the uplink transmission. Next, the UE 100 (UE 2) detects no signal from other device for the subframe 5, determines to use the subframe 5 for the uplink transmission, and transmits the uplink data to the eNB 200 in the subframe 5.

As illustrated in FIG. 18(*c*), the UE 100 (UE 3) detects a signal from other device in the LBT immediately before each of the subframes 5 to 7, and determines not to use the subframe 5 to 7 for the uplink transmission. Next, the UE 100 (UE 3) detects no signal from other device for the subframe 8, determines to use the subframe 8 for the uplink transmission, and transmits the uplink data to the eNB 200 in the subframe 8.

Other Embodiments

The UE 100 has determined the transmission timing based on the received power in the unlicensed band channel hereinabove. However, the UE 100 may determine the transmission timing also taking into consideration a header to be received in the unlicensed band channel.

The above-described first to eighth embodiments are not limited to the case of being separately and independently implemented. Two or more embodiments among the first to eighth embodiments may be implemented in combination. Specifically, some or all of the configurations in each of the embodiment may be applied to or combined with other embodiments.

In the first to eighth embodiments described above, the example in which the same eNB 200 manages the cell #1 (licensed band) and the cell #2 (unlicensed band) has been described. However, the present invention can also be applied to a case where different eNBs 200 manage the cell #1 (licensed band) and the cell #2 (unlicensed band).

In the first to eighth embodiments described above, the candidate timing information is transmitted and received via the licensed band. However, the candidate timing information may be transmitted and received via the unlicensed band.

In the first to eighth embodiments described above, the LTE system is exemplified as the mobile communication system. However, the present invention is not limited to the LTE system. The present invention may be applied to a system other than the LTE system.

[Additional Note]
(1. Introduction)
So far, discussions in RAN1 are only focused on the DL-only LAA. In this contribution, we consider the functionalities of UL LAA especially for the UL grant and the UL LBT.

Figure 19:
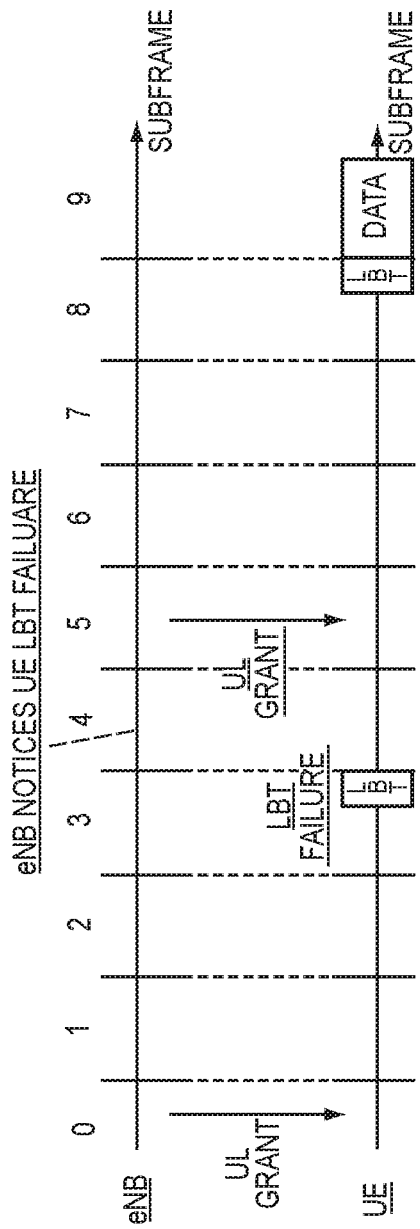
FIG. 19 is a view illustrating an example of a delay of UL transmission according to an appendix.
Figure 20:
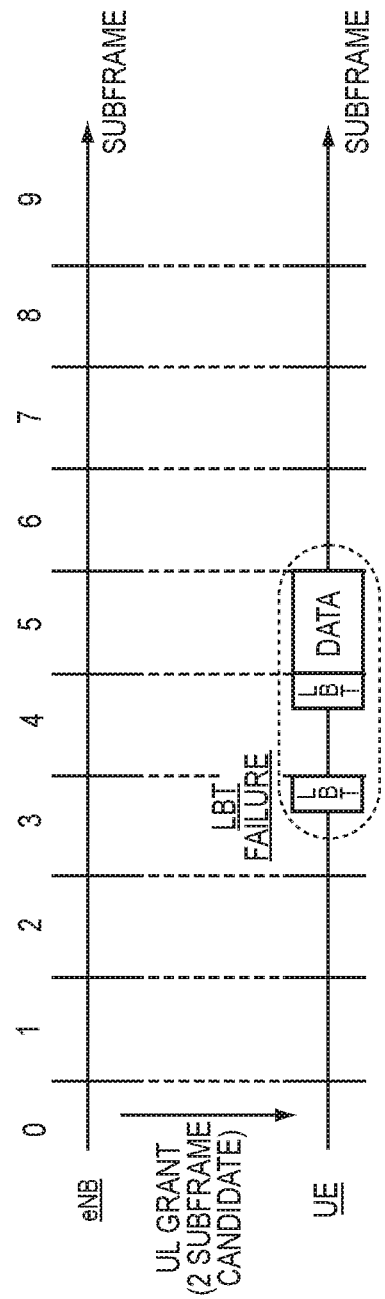
FIG. 20 is a view illustrating an example of a proposed UL grant according to the appendix.

(2. Consideration on UL Grant)
FIG. 19 illustrates an example of the delay of UL transmission. FIG. 20 illustrate an example of proposed UL grant.

In UL LAA, we believe UE should perform LBT before the UL transmission. Therefore, UEs must have some flexibility to decide if they should transmit data. Unlike licensed LTE, eNB cannot control the exact timing of UL transmission. FIG. 19 show the delay in a UL Transmission when UL grant is transmitted to the UE. As shown in the figure after the eNB sends an UL grant to the UE, the UE may not be able to transmit its data in the required subframe due to the LBT failure. In addition, if the eNB sends another UL grant next UL data transmission opportunity may not occur for a long period of time, causing a large delay in the UL LAA transmissions.

Therefore, we propose two or more potential subframes as the data transmission opportunities to be indicated in one UL grant sent by the serving eNB.

Proposal 1: Two or more candidate subframes should be indicated in one UL grant for UL LAA.

In addition, we support 1 UE occupy the whole bandwidth in UL transmission because eNB cannot exactly control UE transmission due to UE LBT. In such case, the UL grant DCI bits used for indicating the frequency position of resource blocks can be deleted and the bits for candidate subframe should be added.

Furthermore, in UL, Synchronous HARQ cannot be achieved due to UL LBT. Process IDs of HARQ can be indicated by eNB or it is possible that UE automatically select them and piggyback them with Data.

Proposal 2: In UL LAA, one UE should use the whole bandwidth in one channel.

Proposal 3: The UL grant DCI bits used for indicating the frequency position of resource blocks can be deleted and the bits for the candidate subframes should be added.

Proposal 4: Asynchronous HARQ should be supported in UL LAA.

Figure 21:
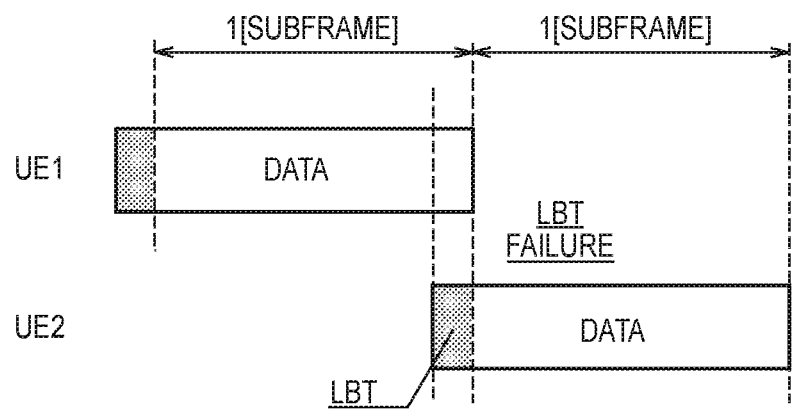
FIG. 21 illustrates an example of continuous transmission between two UEs according to the appendix.

(3. Issue on UL LBT)
FIG. 21 illustrate an example of continuous transmission between 2 UEs.

In this section, we consider another issue related to the UL LBT. As shown in FIG. 21, if the eNB allocate the continuous subframes for multiple UEs (UE1 and UE2), then it is possible one of the UEs may experience LBT failure.

Therefore, we propose eNB should be able to send an indication to the UE 1 to omit the last symbol in order to coordinate a continuous transmission with the second UE 2. This indication should be included in UL grant because the need for omitting the last symbol changes dynamically.

Proposal 5: eNB should be able to send an indication to the UE to omit transmitting the last symbol.

Proposal 6: The last symbol omission should be achieved by puncturing.

CROSS REFERENCE

The entire contents of U.S. Provisional Application No. 62/134,218 (filed Mar. 17, 2015) are incorporated herein by reference.

INDUSTRIAL APPLICABILITY

The present invention is advantageous in the field of communication.

The invention claimed is:
1. A user terminal used in a mobile communication system, comprising:
a receiver configured to receive, from a base station, candidate timing information indicating candidate timings of uplink transmission in an unlicensed band channel, which is an unlicensed band frequency channel;
a controller configured to determine a transmission timing to perform the uplink transmission to the base station from among the candidate timings indicated by the candidate timing information, by monitoring the unlicensed band channel; and
a transmitter configured to transmit uplink data to the base station via the unlicensed band channel at the transmission timing, wherein
the transmitter is configured to transmit, to the base station via a licensed band, a notification signal which indicates that the uplink data is transmitted via the unlicensed band channel.

2. The user terminal according to claim 1, wherein
the receiver is configured to receive the candidate timing information transmitted from the base station via a licensed band.

3. The user terminal according to claim 1, wherein
the transmitter is configured to transmit the uplink data using a whole band of the unlicensed band channel.

4. The user terminal according to claim 1, wherein
the transmitter is configured to transmit identification information of the own user terminal together with the uplink data via the unlicensed band channel.

5. The user terminal according to claim 1, wherein
the transmitter is configured to transmit the uplink data scrambled with identification information of the own user terminal via the unlicensed band channel.

6. The user terminal according to claim 1, wherein
the receiver is configured to receive the candidate timing information from the base station via a physical downlink control channel.

7. The user terminal according to claim 6, wherein
the receiver is configured to receive the candidate timing information instead of receiving information indicating a resource block that needs to be used for uplink transmission.

8. The user terminal according to claim 1, wherein
the transmitter is configured to further transmit, to the base station, HARQ information which indicates a HARQ process and/or a redundancy version corresponding to the uplink data.

9. The user terminal according to claim 1, wherein
the receiver is configured to further receive, from the base station, HARQ information which indicates a HARQ process and/or a redundancy version associated with the candidate timing information, and
the transmitter is configured to transmit the uplink data according to the HARQ information at the transmission timing.

10. The user terminal according to claim 1, wherein
the candidate timing information is information indicating a period including a plurality of the candidate timings, and
the transmitter is configured to transmit the uplink data corresponding to only one HARQ process and/or one redundancy version within the period.

11. A base station used in a mobile communication system, comprising:
a transmitter configured to transmit, to a user terminal, candidate timing information indicating candidate timings of uplink transmission in an unlicensed band channel, which is an unlicensed band frequency channel; and
a receiver configured to receive uplink data from the user terminal via the unlicensed band channel at a transmission timing determined by the user terminal from among the candidate timings indicated by the candidate timing information, wherein
the receiver is configured to receive, from the user terminal via a licensed band, a notification signal which indicates that the uplink data is transmitted via the unlicensed band channel.

12. The base station according to claim 11, wherein
the transmitter is configured to transmit the candidate timing information to the user terminal via a licensed band.

13. The base station according to claim 11, wherein
the receiver is configured to receive the uplink data transmitted using a whole band of the unlicensed band channel.

14. The base station according to claim 11, wherein
the receiver is configured to receive identification information of the user terminal together with the uplink data via the unlicensed band channel.

15. The base station according to claim 11, wherein
the receiver is configured to receive the uplink data scrambled with identification information of the user terminal via the unlicensed band channel.

16. The base station according to claim 11, wherein
the transmitter is configured to transmit the candidate timing information to the user terminal via a physical downlink control channel.

17. The base station according to claim 16, wherein
the transmitter is configured to transmit the candidate timing information instead of transmitting information indicating a resource block that needs to be used for uplink transmission.

18. The base station according to claim 11, wherein
the receiver is configured to further receive, from the user terminal, HARQ information which indicates a HARQ process and/or a redundancy version corresponding to the uplink data.

19. The base station according to claim 11, wherein
the transmitter is configured to further transmit, to the user terminal, HARQ information which indicates a HARQ process and/or a redundancy version associated with the candidate timing information, and
the receiver is configured to receive the uplink data according to the HARQ information at the transmission timing determined by the user terminal.

20. The base station according to claim 11, wherein
the candidate timing information is information indicating a period including a plurality of the candidate timings, and
the receiver is configured to receive the uplink data corresponding to only one HARQ process and/or one redundancy version within the period.

21. The base station according to claim 11, wherein
the transmitter is configured to transmit first candidate timing information to a first user terminal and transmit second candidate timing information to a second user terminal,
the first candidate timing information is information indicating a first period comprising a plurality of candidate timings,
the second candidate timing information is information indicating a second period including a plurality of candidate timings, and
some candidate timings included in the first period overlap some candidate timings included in the second period.

* * * * *